May 31, 1927.
E. SANDSTROM
1,630,541
TOOL DRIVING SPINDLE
Filed Nov. 25, 1921
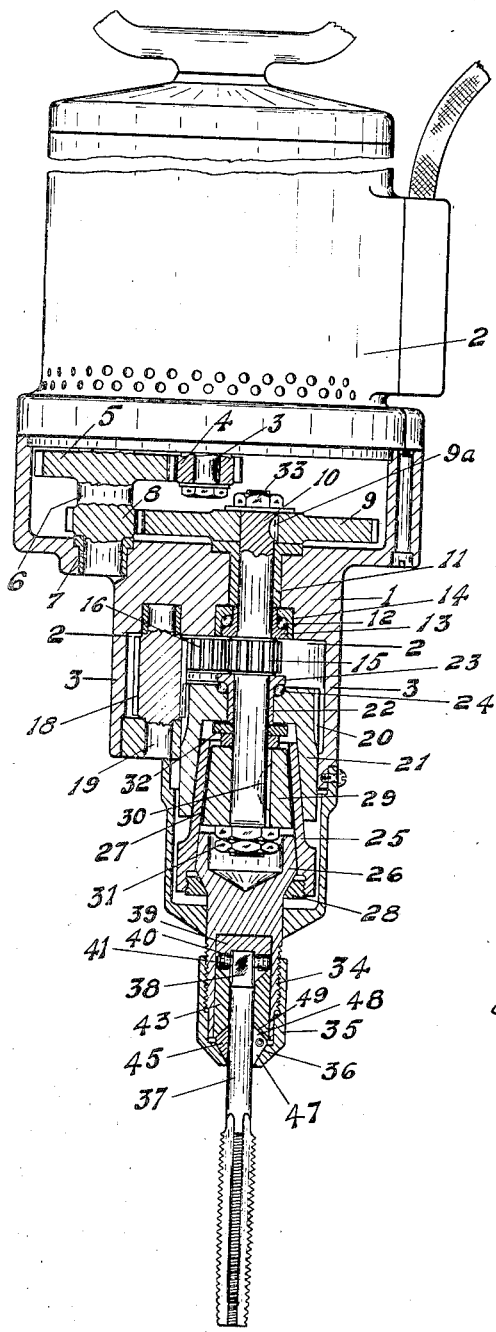
Inventor
Erik Sandstrom
By
Attorney Patented May 31, 1927.

1,630,541

UNITED STATES PATENT OFFICE.

ERIC SANDSTROM, OF ERIE, PENNSYLVANIA.

TOOL-DRIVING SPINDLE.

Application filed November 25, 1921. Serial No. 517,833.

This invention is designed to drive a tool, the driving engagement being effected by the thrust on the tool and the tool is reversed by a pull on the tool, the tool being preferably driven at a greater speed in one direction than the other. Devices accomplishing the general purpose have heretofore been made but the present invention is designed to simplify such devices. The invention further relates to a means of securing a tool in the driving spindle.

The invention is illustrated in the accompanying drawings as follows:—

Fig. 1 shows a central vertical section of the device, the device being arranged as a portable drill.

Fig. 2 a section on the line 2—2 in Fig. 1.
Fig. 3 a section on the line 3—3 in Fig. 1.
Fig. 4 a plan view of a key-holder.
Fig. 5 a side elevation of the same holder.
Fig. 6 a side elevation of one of the keys.
Fig. 7 a top view of a cam sleeve.
Fig. 8 a section on the line 8—8 in Fig. 7.
Fig. 9 a plan view of segmental jaws.
Fig. 10 a section on the line 10—10 in Fig. 9.

1 marks the frame, 2 the motor, 3 the driving shaft of the motor, 4 a gear fixed on the driving shaft, 5 a gear meshing with the gear 3, 6 a shaft on which the gear 5 is mounted, 7 a journal for the shaft 6, 8 a gear fixed on the shaft 6, 9 a gear meshing with the gear 8, and 10 a shaft on which the gear 9 is fixed. 9ª is a key locking the gear 9 against turning on the shaft 10.

The shaft 10 is carried in a bearing 11 arranged in the frame 1. The shaft is also provided with a thrust bearing 12 having the cup 14 in the frame 1 and the cup 13 on the shaft. A gear 15 is fixed on the shaft 10 and meshes with an intermediate gear 16. The intermediate gear 16 is fixed on the shaft 17 and meshes with a gear 18. The gear 18 is mounted on the shaft 19 journaled in the frame and the gear 18 meshes with a gear 20 on a driving member 21. The driving member 21 is journaled on a bushing 22 carried by the shaft 10. This bushing has a shoulder 23 carrying one race of a ball bearing 24 taking the thrust of the member 21. A driven member 25 carries a chuck, the shaft 26 of which extends into a conical inner surface 27 of the member 25 and is clamped therein by a nut 28. A reverse driving member 29 is fixed on the shaft 10, being keyed thereon by a key 30. Nuts 31 are screwed on to the end of the shaft 10 clamping the member 29, collars 32, bushing 22, gear 15, cup 13, bushing 11 and gear 9 against the nut 33 at the top of the shaft, this entire assembly it will be noted being clamped in this way. The member 25 which I term the driven member has a tapered outer surface and the member 21 which I term a forward driving member has an interior tapered surface conforming to the surface of the member 25. This taper is so arranged as to give a friction engagement sufficient to drive the tool. The member 29 has an exterior conical surface which engages an interior conical surface on the member 25. When the tool is subjected to pull as drawing a drill from a hole the member 25 engages the member 29 and is driven in a reverse direction from that of the member 21 at a higher rate of speed because of the difference in the size of the gears 15 and 20.

In the operation of the device, the shaft 10 is driven from a motor, or any convenient source of power. The thrust of the tool carries the driven member 25 against the member 21 and it is driven forward through the gearing at a desirable driven speed. In withdrawing the tool from the cut the thrust is reversed bringing the member 25 into engagement with the member 29 which results in a higher speed in a reverse direction.

This device is particularly advantageous because of the very slight movement necessary to bring about the reversal of the movement. The play between the member 25 and the members 21 and 29 may be very slight indeed and still leave the mechanism free to operate. With the positively locking clutches the movement to accomplish this is very much greater.

A convenient method of securing the tool is shown. The shank 26 terminates in a screw-threaded head 34 on which a screw-threaded clamping collar 35 is arranged. The lower end of the collar has the tapered throat 36. A tap 37 is shown in place in the chuck. It has a squared end 38. A floating key-holder 39 is arranged in the head 34. It has radial slots 40 in which the keys 41 are placed. The holes are such as to limit the radial movement and still permit sufficient radial movement of the keys to engage an inserted tool. The holder has a slot 42 leading to the keyway 40 which permits of the entrance of the cams 44 on a floating cam sleeve 43.

These cams when pushed axially operate on the keys 41 to crowd them inwardly, thus clamping the inserted tool. Jaws 45 are arranged within the throat 36 and within a cam 49 at the lower end of the sleeve 43. These jaws are normally expanded by the springs 46 and have the tapered surface 47 at the bottom and the tapered surface 48 at the top, the surface 47 engaging the throat 36 and the surface 48 the cam 49. As the collar 35 is screwed on to the head the jaws are clamped on the tool thus centering it. The floating cam sleeve is moved axially, thus clamping the key against the tool. In this way there is a double locking effect on the tool.

It will be noted that the connection with the motor with its housing drives the spindle and locks the frame on which the gearing is mounted.

What I claim as new is:—

1. In a tool driving spindle, the combination of a driven friction clutch member in the form of a sleeve having inner and outer conical surfaces both inclined in the same direction; a forward driving friction clutch member having a conical surface conforming to and engaged by one of the conical surfaces of the friction clutch member when it is subjected to thrust; and a reverse driving friction clutch member having a conical surface conforming to and engaging the other surface of the driven member when the driven member is subjected to pull.

2. In a tool driving spindle, the combination of a frame; a shaft journaled in the frame; a thrust bearing for the shaft; a member fixed on the shaft having an exterior conical friction surface; a member journaled on the shaft having an interior friction surface; a gearing between the member journaled on the shaft and the shaft; a conical sleeve between and conforming to the friction surfaces of said members; and a tool driven by the conical sleeve.

In testimony whereof I have hereunto set my hand.

E. SANDSTROM.